United States Patent
Bauer et al.

(10) Patent No.: US 10,776,962 B2
(45) Date of Patent: Sep. 15, 2020

(54) METHOD AND APPARATUS FOR THE RECONSTRUCTION OF MEDICAL IMAGE DATA USING FILTERED BACKPROJECTION

(71) Applicants: Sebastian Bauer, Erlangen (DE); Andreas Maier, Erlangen (DE); Yan Xia, Erlangen (DE)

(72) Inventors: Sebastian Bauer, Erlangen (DE); Andreas Maier, Erlangen (DE); Yan Xia, Erlangen (DE)

(73) Assignee: Siemens Healthcare GmbH, Erlangen (DE)

( * ) Notice: Subject to any disclaimer, the term of this patent is extended or adjusted under 35 U.S.C. 154(b) by 138 days.

(21) Appl. No.: 15/589,321

(22) Filed: May 8, 2017

(65) Prior Publication Data
US 2017/0323462 A1    Nov. 9, 2017

(30) Foreign Application Priority Data
May 9, 2016    (DE) .......................... 10 2016 207 905

(51) Int. Cl.
G06T 11/00    (2006.01)

(52) U.S. Cl.
CPC ....... *G06T 11/006* (2013.01); *G06T 2211/421* (2013.01); *G06T 2211/432* (2013.01)

(58) Field of Classification Search
None
See application file for complete search history.

(56) References Cited

U.S. PATENT DOCUMENTS

| 5,953,388 A * | 9/1999 | Walnut ................. G06T 11/006 378/4 |
| 2013/0051674 A1* | 2/2013 | Goossens .............. G06T 5/002 382/173 |
| 2013/0147843 A1* | 6/2013 | Shimizu ................. G06T 11/60 345/647 |
| 2013/0315453 A1* | 11/2013 | Cao ....................... A61B 6/032 382/128 |

OTHER PUBLICATIONS

Image reconstruction using wavelet transform with extended fractional fourier transform, by Tammireddy et al, Blekinge Institute of Technology, Jun. 2014 (Year: 2014).*
Beylkin, G. et. al.: "Fast Wavelet Transforms and Numerical Algorithms I", in: Communications on Pure and Applied Mathematics, vol. XLIV, pp. 141-183 (1991).
Delaney, H. et. al.: "Multiresolution Tomographic Reconstruction Using Wavelets", in: Image Processing, IEEE Transactions on, vol. 4, No. 6, 1995, pp. 799-813.
Dennerlein Frank, et.al.: "Approximate truncation robust computed tomography-ATRACT", in: Phys. Med. Biol., vol. 58, pp. 6133-6148, 2013.

(Continued)

*Primary Examiner* — Vikkram Bali
(74) *Attorney, Agent, or Firm* — Lempia Summerfield Katz LLC

(57) ABSTRACT

A system and method are provided for the reconstruction of medical image data using filtered backprojection with the use of a wavelet transformation. A filter function is applied to at least one part of an object using projection data captured with a detection device prior to backprojection.

15 Claims, 2 Drawing Sheets

(56) References Cited

OTHER PUBLICATIONS

Feldkamp L.A. et al., "Practical cone-beam algorithm", in: Journal of the Optical Society of Americal A, vol. 1, No. 6, 1984, pp. 612-619.
Frederic Noo et al. "A two-step Hilbert transform method for 2D image reconstruction", Phys. Med. Biol. 49 (2004), pp. 3903-3923.
Gonzales, R.C. et al.: Digital Image Processing; Second Edition. Prentice-Hall, 2002, p. 230-239.; 2002.
Hsieh J., et.al. : "A novel reconstruction algorithm to extend the CT scan field-of-view" Med. Phys. Nr. 31, vol. 9, pp. 2385-2391, Sep. 2004.
Kolditz D. et al.: "Volume-of-interest (VOI) imaging in C-arm flat-detector CT for high image quality at reduced dose"; Medical Physics, vol. 37, No. 6, pp. 2719-2730, 2010.
Olson, T. et. al.: "Wavelet Localization of the Radon Transform", in: IEEE Transactions on Signal Processing, vol. 42, No. 8, 1994, pp. 2055-2067.
Schafer Sebastian, et.al. :"Filtered region of interest cone-beam rotational angiography", in: Med. Phys. vol. 37, Nr.2, pp. 694-703, Feb. 2010.

\* cited by examiner

METHOD AND APPARATUS FOR THE RECONSTRUCTION OF MEDICAL IMAGE DATA USING FILTERED BACKPROJECTION

CROSS REFERENCE TO RELATED APPLICATIONS

This application claims the benefit of DE 102016207905.0 filed on May 9, 2016, which is hereby incorporated by reference in its entirety.

FIELD

Embodiments relate to a method for a reconstruction of medical image data using filtered backprojection.

BACKGROUND

Filtered backprojection is a method for image reconstruction from data, for example projection data acquired using a tomographic method. For a three-dimensional image reconstruction, two-dimensional projection data of an examined object or an object to be examined is recorded at different irradiation and/or detection angles. The projection data is then filtered and backprojected in a two-step method to obtain image data representing the original object. The Feldkamp-Davis-Kress algorithm (FDK algorithm) is a known method and is described in the publication "Practical cone-beam algorithm", Journal of the Optical Society of America, Volume 1, No. 6, 1984 by L. A. Feldkamp et al.

The filter is a ramp filter applied on a line basis where the filtering of the projection data may be expressed mathematically as a convolution. A disadvantage is that the one-dimensional ramp filter is not local and the core has an infinitely extensive support in the position space. The disadvantage provides the presence of truncated, e.g. cut-off, projection data that does not represent the complete original object in an exact image reconstruction. Intensity changes in the edge areas of the truncated data, for example, a jump or a transition of the data values to zero, ultimately result in recognizable unwanted image artifacts, such as for example unrealistically light areas, in the reconstructed image data. The artifacts occur, for example, at the edges of the area considered for the relevant examination, that is of particular importance or interest (ROI, region of interest) and are also designated as cupping or capping artifacts.

Previous solution approaches to avoid the artifacts and to achieve as accurate a reconstruction as possible of truncated data are accompanied by increased radiation or dosage exposure of the examined object that may occur, for example, outside of the relevant area that is of interest and/or may subsequently be reconstructed.

In the publication "Wavelet localization of the Radon transform", IEEE Transactions on Signal Processing, Volume 42, No. 8, 1994 T. Olson and J. DeStefano describe an algorithm in which the properties of wavelets are utilized to full advantage to localize largely the applied radon transformation, allowing the radiation exposure to be reduced during an examination of a limited area of an object. However, in addition to the truncated projection data at least one sparse set of untruncated projection data is required so that the radiation exposure is not limited to the ROI and a practical application may be difficult.

In the publication "Multiresolution tomographic reconstruction using wavelets", IEEE Transactions on Image Processing, Volume 4, No. 6, 1995 A. H. Delaney and Y. Bresler describe an algorithm based on a multiscale analysis with which only a limited image area or data area is reconstructed with a high resolution. Instead of reconstructing the image data representing the originally examined object or the corresponding function from the projection data itself, a two-dimensional wavelet decomposition of the object function is constructed and the object function is determined using a conventional reconstruction or filter bank based on a multiscale analysis from the filtered coefficients of the wavelet decomposition. There is the disadvantage that an additional area of the examined object disposed around the finally reconstructed region available for a diagnosis is exposed to ionizing radiation.

SUMMARY

Embodiments provide a method and an apparatus for a reconstruction of truncated medical image data with as low a radiation exposure as possible.

An examination of an object is carried out, for example, using a computed tomography system or a C-arm or a capture of projection data of an object and/or projection data in a format is made available to be processed. The object may be any object or any material, for example a human body, a part of a human body, or biological tissue or material.

In an embodiment, a method for reconstruction, for example, of truncated medical image data with as low a radiation exposure as possible is provided. The filter function is applied in the wavelet space. A wavelet transformation or a wavelet decomposition is applied to the projection data captured using the detection device and initially defined or available in the position space. The filter function is defined in the position space or the core is represented or displayed in the wavelet space, for example, as a matrix, before the filter function is applied to the transformed projection data. A result of performing the filtering in the wavelet space or in the wavelet domain instead of a conventional filtering in the position space or Fourier space is that the representation of the filter function or the filter matrix in the wavelet space is of a local nature or has advantageous localization properties. A selection of a wavelet base function may provide that entries not lying on relevant main diagonals of dyadic submatrices of the filter matrix rapidly subside with increasing distance from the respective main diagonals or become smaller, e.g. as a localization property of wavelets. The small entries not on the relevant main diagonals or in the immediate vicinity may be ignored, appearing as localization of the filter in the wavelet space. The originally not local position or Fourier space filter operator may be compressed into a filter operator with a local or short support in the wavelet space. In addition to a reconstruction or representation, for example, of truncated image or projection data while avoiding additional radiation exposure, the required calculation effort may be reduced or a calculation efficiency may be increased by a restriction (without significant limitations) of the calculations to the main diagonal entries or narrow bands of matrix elements different to zero running along the main diagonals.

Functions or base functions based on a continuous or discrete wavelet transformation may be designated as a wavelet. Different wavelets are known. In an embodiment, Daubechies wavelets that form a class of orthogonal wavelet functions with compact support may be used.

Filtered backprojection (FBP) or the FDK algorithm may be used.

In an embodiment, prior to applying the filter function a discrete wavelet transformation (DWT) is applied to the projection data and after applying the filter function a corresponding inverse wavelet transformation is applied. The backtransformation of the filtered projection data is carried out from the wavelet space using a discrete (then inverse) wavelet transformation where a discrete wavelet transformation is a wavelet transformation that is performed discretely as regards time and frequency. A discrete wavelet transformation may, for example, be implemented efficiently as a series of time-discrete filters, e.g. for specific practical calculation purposes, also, for example as tomography data is present in discrete form.

In an embodiment a wavelet function, a scaling function, and a redundant decomposition or wavelet decomposition that links the wavelet coefficients and the scaling coefficients together are used for the wavelet transformation of the projection data. A conventional standard form is not used for the wavelet decomposition or transformation and but rather a line-based, representation of the projection data in the wavelet space is used (cf. "Fast Wavelet Transforms and Numerical Algorithms I" by G. Beylkin, R. Coifman and V. Rokhlin, Communications on Pure and Applied Mathematics, Volume XLIV, 1991, pages 141 to 183). The nonstandard form leads to a decoupling of the wavelet scales or scaling levels, resulting in reduced algorithmic complexity and calculation effort. A convolution to be applied in conventional methods in the position space may be formulated as a matrix multiplication in the wavelet space.

In an embodiment, the approximate values of the filtered projection data obtained using the inverse wavelet transformation are used for the subsequent or concluding backprojection for the final generation of the reconstructed image. The exact scope of the approximation may be dependent on the respective specific requirements, for example a required calculation effort and/or an image quality of the final reconstructed image data expressed as a noise behavior, as well as on the projection data available as input data.

In an embodiment, prior to the inverse wavelet transformation, values in an edge area of the projection data and above a defined limit value of for example truncated, filtered projection data, are removed for example at each scaling level. A specific limit value, for example in the form of a gray value for an image representation, may be defined as dependent on individual requirements or the scope of the truncating of the projection data. Data values from the filtered projection data with a value or numerical amount that is greater than the defined limit value or gray value may be removed from the filtered projection data and for example may each be replaced with a corresponding value of zero. Alternatively, a subset of data values may be replaced with a value different from zero that may, for example, be based on data points surrounding the values or may be set to a specific amount in advance. However, individual data points may then be removed or set to a value of zero or another adjusted value if the value at the corresponding data point is above the defined limit value and the data point, for example the corresponding pixel, is disposed at an edge of the data area or image area. The application prior to the inverse wave transformation results in the removal or adjustment of values or data still takes place in the wavelet space. An image quality or reconstruction quality, for example in the case of truncated output data, may be improved as such a corresponding type of high-frequency image artifacts do not occur in the reconstructed image or in the reconstructed image data. The values lying above the limit value, that may also be defined as high-frequency peaks, may be considered separately, or removed or adjusted, for example, at each individual scaling level or scale level or at each wavelet coefficient level.

In an embodiment, the filter function applied in the wavelet space to the projection data is a transformed form of a ramp filter in the frequency space. The mathematical object applied actually in the wavelet space to the wavelet-transformed projection data is based on a filter that has a ramp-type design in the frequency space. Such a ramp filter has the effect of filtering out low frequencies and allowing high frequencies to pass, resulting in an at least largely linear behavior across the entire frequency range, minimizing a blurring or a lack of clarity. By using a ramp filter or a filter function based on a ramp filter, the desired image may be reconstructed as effectively as possible.

In an embodiment, when applied to the transformed projection data in the wavelet space, the filter function is present as a matrix representation of the filter function originally defined in the position space where matrix elements below a threshold value in the corresponding matrix, for example outside of a main diagonal of the matrix, are removed or, for example, replaced with zero entries. The filter matrix or the corresponding coefficient matrix, that represents the filter or the filter function in the wavelet space, is thinned out before applied to the transformed projection data in order to achieve improved localization. The corresponding procedure may be referred to as thresholding. The degree or the extent of the localization is dependent on the selected threshold value that also has a significant effect as regards the noise behavior, for example as regards the noise present in the final reconstructed image data. The threshold value may also be adjusted as a function of the truncating of the projection data where a single empirical determination or definition of a constant amount of the threshold value is used or a value used on the basis of untruncated data. As a result of thresholding, an advantageous localization and an increased computing efficiency is provided by reducing the width of the range-based areas of entries different to zero along the respective main diagonals of the submatrices of the filter matrix or coefficient matrix.

In an embodiment, an apparatus is also provided for the reconstruction of medical image data using filtered backprojection with use of a wavelet transformation. The apparatus includes a detection device and a computing device with a storage device. The apparatus may be configured to implement the method. The apparatus may be configured for dynamic or flexible selection and subsequent implementation of different variants or embodiments of the method. The apparatus may include, for example, a radiation source and/or a device for arranging, holding, or fixing the object to be examined.

In an embodiment, the apparatus includes a specifically electronic non-volatile storage device in which a matrix representation of the filter function in the wavelet space cleared of any values below a defined threshold is stored for application according to the method on the transformed projection data. A wavelet transformation of the filter function or of the filter matrix as well as the thresholding may not be performed. The transformation or thresholding may not be performed before each application of the filtering of a particular set of transformed projection data. Computing effort and time may be saved and an optimum corresponding threshold value may be selected in advance, for example, using untruncated data.

The scope of the present invention is defined solely by the appended claims and is not affected to any degree by the statements within this summary. The present embodiments may obviate one or more of the drawbacks or limitations in the related art.

DETAILED DESCRIPTION

Figure 1:
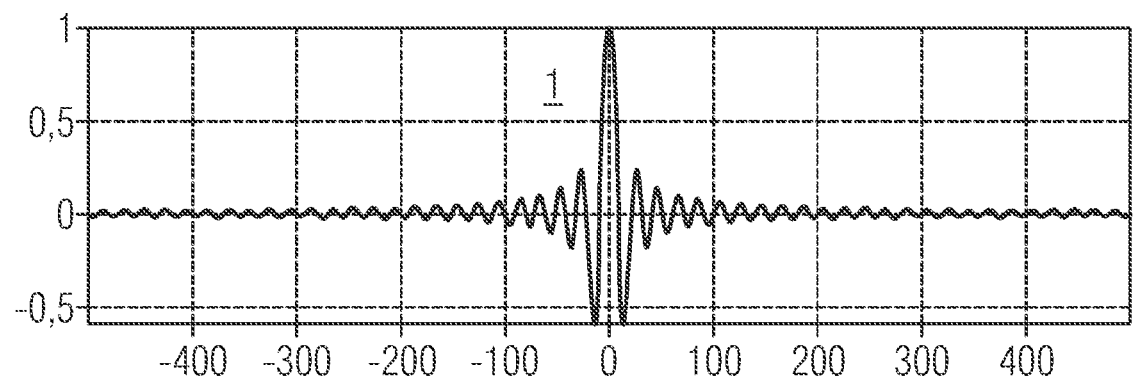
FIG. 1 depicts an example graphical representation of a core of a conventional ramp filter matrix where the x-axis indicates spatial coordinates and the y-axis indicates associated values.

Embodiments include a standard filtered backprojection (FBP) method. For FBP, an object to be examined is first examined, for example, using an X-ray computed tomography system. The examination (e.g., irradiation) of the object at different angles and the respective detection of radiation passing through the object provides in each case two-dimensional sets of projection data captured using a flat (e.g., subdivided into individual pixels) detection device. Only spatially limited subareas of the object may be examined or irradiated in order to keep the radiation exposure or the dose as low as possible for the object. As a result, only cut off or truncated projection data is available.

Conventional methods may apply a simple ramp filter in the position space or Fourier space to the projection data before the projection data is backprojected in a backprojection step into the volume of the examined object in order to obtain a reconstructed three-dimensional image of the object. Applying the ramp filter leads to an improved image or reconstruction quality, as a blurring or smearing of the projection data available only two-dimensionally is at least partially compensated by the spatial third dimension of the projection volume. For only section-wise examination of the object and hence truncated projection data at the respective edges of the examination section or area, cupping or capping artifacts occur at the edges during image reconstruction. The artifacts reduce the reconstruction quality, as the artifacts do not represent any actual properties of the examined object and are therefore a falsification.

Embodiments provide a better image or reconstruction quality using a wavelet transformation. The filter function is applied in the wavelet space. The filtering (e.g., the application of the ramp filter on the projection data) takes place on a line basis (e.g., separately for each line of the two-dimensional projection data or of the two-dimensional set of projection data captured by the detection device with pixels arranged in a line). The one-dimensional (e.g., line-based) filtering of an individual projection data line of the dimension $\mathbb{R}^N$ where $N=2^n$ may be depicted as a matrix multiplication:

$$p_F = Rp \qquad (1)$$

where $R \in \mathbb{R}^{N \times N}$ designates the ramp filter matrix, $p \in \mathbb{R}^N$ designates a line of the captured projection data, and $p_F \in \mathbb{R}^N$ designates the corresponding filtered projection data. n specifies a maximum possible degree or level or stage of the wavelet transformation. A basis or an affine system of functions that form a Hilbert basis (e.g., a complete orthonormal system in the function space $L^2(\mathbb{R})$ of the square-integrable functions) is constructed from a wavelet function $\psi$ and a scaling function $\varphi$, defined as follows:

$$\psi^j_k(t) = 2^j \psi(2^j t - k)$$

$$\varphi^j_k(t) = 2^j \varphi(2^j t - k), \qquad (2)$$

where $j=1, 2, \ldots, n$ represents an extension or a scaling level, and $k \in \mathbb{Z}$ represents a position or translation. The basis may be used to perform a wavelet transformation or wavelet decomposition of the projection data line p to obtain the transformed projection data line $\tilde{p}$:

$$\tilde{p} = \sum_{j=0}^{n} \sum_{k=1}^{2^{n-j}} (d^j_k \Psi^j_k + c^j_k \varphi^j_k), \qquad (3)$$

where $d^j_k$ designates respective wavelet coefficients, and $c^j_k$ designates respective scaling coefficients at the scaling level j. The basis is a non-standard form or a redundant decomposition or representation that links the wavelet coefficients $d^j_k$ and the scaling coefficients $c^j_k$, providing a convolution used in the position space depicted as a matrix multiplication in the wavelet space. In an embodiment, the two-dimensional ramp filter matrix R may also be represented using a corresponding wavelet transformation or wavelet decomposition as a transformed ramp filter matrix $\tilde{R}$ as:

$$\tilde{R} = \sum_{i,i'} \alpha^j_{k,k'} \psi_k \psi_k \sum_{i,i'} \beta^j_{k,k'} \Psi_k \varphi_k \sum_{i,i'} \gamma^j_{k,k'} \varphi_k \Psi_k \sum_{i,i'} \omega^j_{k,k'} \varphi_k \varphi_k. \qquad (4)$$

where $\alpha^j = \{\alpha^j_{i,l}\}$, $\beta^j = \{\beta^j_{i,l}\}$, $\gamma^j = \{\gamma^j_{i,l}\}$, $\omega^j = \{\omega^j_{i,l}\}$ designate the two-dimensional wavelet and scaling coefficients in matrix form where $i, l = 1, 2, \ldots, 2^{n-j}$. The totals in equation 4 are calculated across all dyadic quadratic subregions or submatrices $I \times I'$ where $I = I' = I_{j,k} = [2^j(k-1), 2^j k]$, the dimensions or side lengths of which are defined or determined by dyadic intervals, within the ramp filter matrix $\tilde{R}$ or the coefficient matrix that represents the ramp filter in the wavelet space in a non-standard form. In the non-standard form, the transformed ramp filter matrix $\tilde{R}$ may have a dimension of $(2N-2) \times (2N-2)$, where in a standard form, a dimension of $N \times N$ may be present.

FIG. 1 depicts an example graphical representation 1 of a core of an uncompressed ramp filter matrix in a conventional method. Function values different to zero across at least the entire area represented are detectable. Also detectable is the non-localization of the ramp filter or the core or the support.

In an embodiment, the wavelet transformation (e.g., using Daubechies wavelets) results in a localization of the ramp filter matrix $\tilde{R}$ where relatively large values are concentrated along the relevant main diagonals or along the areas or ranges of the submatrices running along the main diagonals. Values below a determined or to be determined threshold value (e.g., outside of the main diagonals or the band-type areas surrounding the main diagonals) may be ignored (e.g., set to zero) without any considerable or significant deterioration in quality occurring as a result during image reconstruction.

Figure 2:
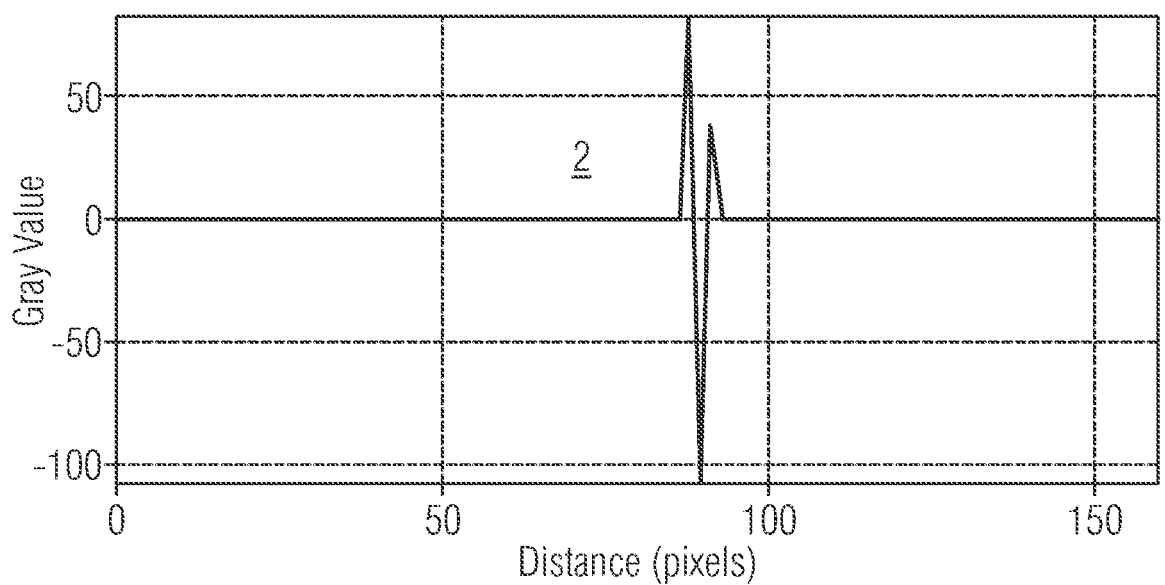
FIG. 2 depicts an example graphical representation of the core of FIG. 1 following a wavelet transformation, reshaping, and thinning out of the associated matrix using thresholding.

Embodiments provide the core depicted as a graphical representation 2 in FIG. 2 after the wavelet transformation and thinning out of the corresponding matrix using thresholding with a significantly shorter or localized ramp filter or ramp filter core or support. All function values outside of a narrowly defined area are identically equal to zero. The results are interpreted as the correct reconstruction of a pixel without requiring knowledge of all of the pixels or projection data values present in the same line. As complete data or information may not be available as a result of the truncating of projection data (e.g., the incomplete or only area-wise representation of the object), a significantly improved reconstruction may be provided as a result of the localization of the ramp filter or the support of the core of the ramp filter matrix R.

Figure 3:
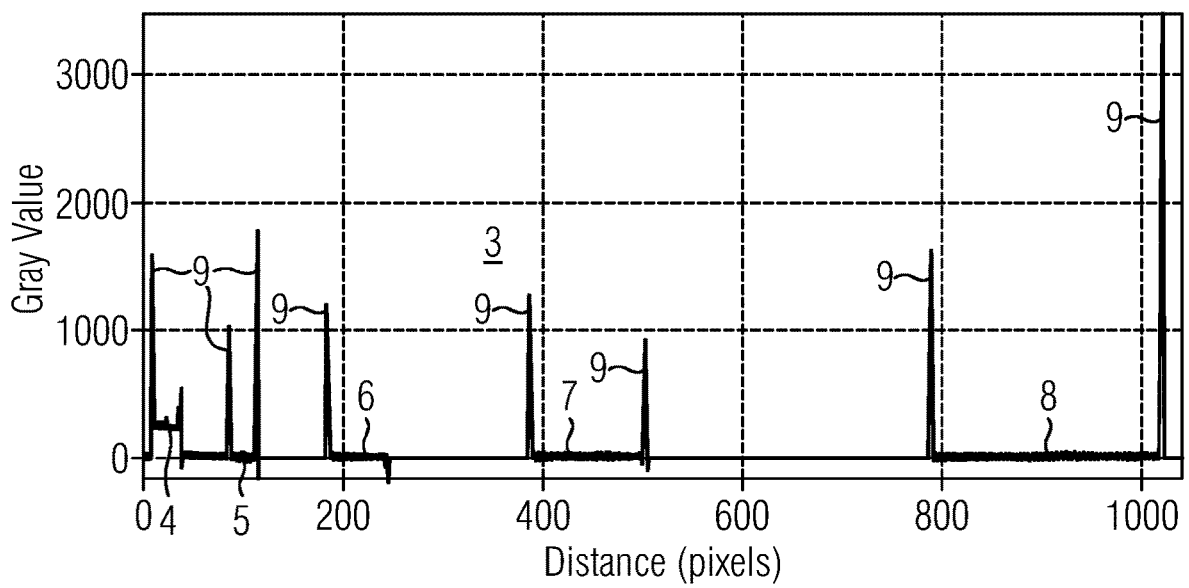
FIG. 3 depicts an example graphical representation of a sample dataset in the wavelet space after application of a ramp filter with artifacts with high values at the respective edges at different scaling levels.

As the localization is not limited to a single pixel or data point, artifacts 9 (see FIG. 3) having an undesired effect on the reconstruction quality may occur at the edges of the data or reconstruction area. The artifacts become evident as narrow peaks or areas with particularly high function values or gray values relevant for a graphical representation, as depicted in FIG. 3 based on a sample data set 3 in the wavelet space. The increasing distances between the peaks or artifacts 9 along the x-coordinates reflect the different scaling levels 4, 5, 6, 7, 8. In a heuristic process or act, the corresponding data points of the artifacts 9 are removed, further improving the reconstruction quality.

Figure 4:
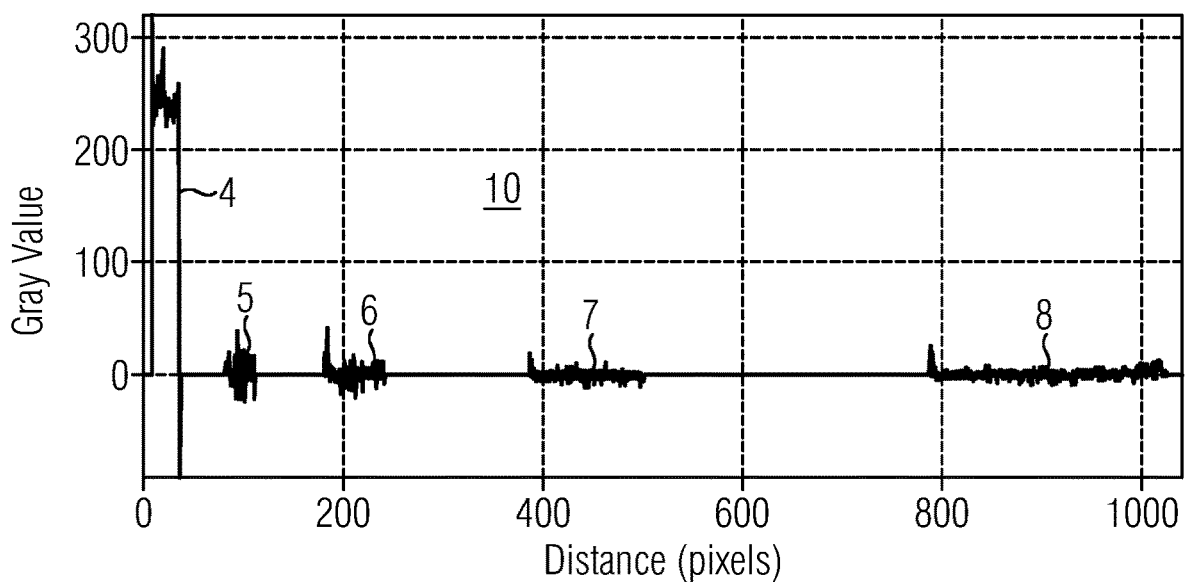
FIG. 4 depicts an example graphical representation of the sample dataset of FIG. 3 cleared of artifacts.

Starting from the sample data set 3 shown in FIG. 3, FIG. 4 depicts a cleansed sample data set 10 as a result of removing the artifacts 9. FIG. 4 depicts not only a considerably lower maximum function value but also a significantly greater uniformity or evenness of the function values at all scaling levels 4, 5, 6, 7, 8.

There is an approximation or estimate $p_F$ of the filtered projection line data $p_F$ that may be described in a composition or inverse wavelet transformation as:

$$\tilde{p}_F = \sum_{j=0}^{n} \sum_{k=1}^{2^{n-1}} (\hat{d}_k^j \Psi_k^j + \hat{c}_k^j \varphi_k^j), \quad (5)$$

with the filtered wavelet coefficients $\hat{d}_k^j$ and scaling coefficients $\hat{c}_k^j$. The coefficients are calculated at each scaling level j as $$\hat{d}^j = \alpha^j(d^j) + \beta^j(c^j) \quad (6)$$

$$\hat{c}^j = \gamma^j(d^j)$$

where $d^j = \{d_k^j\}$, $c^j = \{c_k^j\}$, k=1, 2, ..., $2^{n-j}$ where j=1, 2, ..., n.

To obtain a reconstructed image representation of the examined object, the approximation values $p_F$ backtransformed from the wavelet space (see equation 5) of the filtered projection data $p_F$ are used as input data for the backprojection according to the known FBP method. The act of backprojection is otherwise not altered.

Both the wavelet transformation and the selection or coordination of a suitable threshold value and the subsequent thresholding of the filter matrix or coefficient matrix may be carried out in advance using untruncated projection data. A correspondingly prepared or precalculated transformed and thinned-out or localized matrix may be stored, for example, in an electronic storage device so that in the case of a specific application of the method, it is not necessary for the acts to be repeated at the time of application or runtime. Computing time and effort may be saved and an as effective as possible reconstruction result may be achieved as a result of coordination of the noise behavior.

The application of wavelet based ramp filtering in image reconstruction of tomography data leads to an improved representation with the application on truncated projection data independently of any possible different embodiments. In the case of an application on untruncated projection data, in contrast to conventional methods with which, for example, the ramp filtering is applied in the position or Fourier space based on the known FDK algorithm, at least equivalent or equal representation is achieved.

The wavelet-based method may provide benefits even in the case of untruncated projection data and may lead to an improved representation or reconstruction as, for example, local distortion effects such as defective pixels or non-translucent (e.g., as metallic) objects or areas in the examined object have only a limited localized distorting influence. Further, the wavelet-based ramp filtering as a result of localization properties may also, for example, be used to achieve an improved image reconstruction in methods that use a heuristic extrapolation schema to complete truncated projection data.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for a reconstruction of medical image data using filtered backprojection, the method comprising:
    identifying projection data of an object;
    applying, by a processor, a discrete wavelet transformation to the projection data in a projection space;
    applying, by the processor, a ramp filter function configured as a matrix representation of an original filter function defined in a position space, in the projection space to at least one part of the object of the transformed projection data to provide linear behavior across an entire frequency range of the transformed projection data; and
    applying an inverse wavelet transformation to the filtered transformed projection data in the projection space.

2. The method of claim 1, wherein identifying the projection data of the object comprises acquiring, by a detection device, the projection data of the object prior to the filtered backprojection.

3. The method of claim 1, wherein the wavelet transformation comprises a wavelet function, a scaling function, and a redundant decomposition that links wavelet coefficients and scaling coefficients together.

4. The method of claim 1, wherein approximation values of the projection data resulting from the applying of the corresponding inverse wavelet transformation are used for the filtered backprojection.

5. The method of claim 1, further comprising:
    removing, prior to the applying of the inverse wavelet transformation, one or more values in an edge area of the projection data and above a limit value of truncated, filtered projection data, at each scaling level.

6. The method of claim 1, wherein the ramp filter function is a transformed form of a ramp filter in a frequency space.

7. The method of claim 1, wherein one or more matrix elements below a threshold value are removed or replaced with zero entries.

8. The method of claim 7, wherein the one or more matrix elements are outside of a main diagonal of the matrix.

9. An apparatus for reconstruction of medical image data using filtered backprojection, the apparatus comprising:
  a detection device configured to acquire projection data of an object;
  a memory configured to store the projection data; and
  a processor configured to apply a discrete wavelet transformation to the projection data in a projection space, a ramp filter function configured as a matrix representation of an original filter function defined in a position space, in the projection space to at least one part of the object of the transformed projection data to provide linear behavior across an entire frequency range of the transformed projection data, and an inverse wavelet transformation to the filtered transformed projection data in the projection space.

10. The apparatus of claim 9, wherein the memory is an electronic non-volatile storage device, and the electronic non-volatile storage device is further configured to store a matrix representation of the filter function cleared of any values below a defined threshold value.

11. The apparatus of claim 9, wherein the wavelet transformation comprises a wavelet function, a scaling function, and a redundant decomposition that links wavelet coefficients and scaling coefficients together.

12. The apparatus of claim 9, wherein one or more approximation values of the projection data resulting from application of the corresponding inverse wavelet transformation are used for the filtered backprojection.

13. The apparatus of claim 9, wherein the processor is further configured to remove, prior to application of the inverse wavelet transformation, one or more values in an edge area of the projection data and above a limit value of truncated, filtered projection data, at each scaling level.

14. The apparatus of claim 9, wherein the ramp filter function is a transformed form of a ramp filter in a frequency space.

15. The apparatus of claim 9,
  wherein one or more matrix elements below a threshold value in a corresponding matrix, outside of a main diagonal of a matrix, are removed or replaced with zero entries.

* * * * *